(12) United States Patent
Willempje Blom-Schieber et al.

(10) Patent No.: US 11,224,996 B2
(45) Date of Patent: Jan. 18, 2022

(54) MOLD ASSEMBLY

(71) Applicant: THE BOEING COMPANY, Chicago, IL (US)

(72) Inventors: Adriana Willempje Blom-Schieber, Shoreline, WA (US); Jack Schieber, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 224 days.

(21) Appl. No.: 16/290,323

(22) Filed: Mar. 1, 2019

(65) Prior Publication Data

US 2020/0276734 A1 Sep. 3, 2020

(51) Int. Cl.
*B29C 33/20* (2006.01)
*B22C 9/06* (2006.01)
*B22C 11/00* (2006.01)
*B29C 33/30* (2006.01)

(52) U.S. Cl.
CPC ............ *B29C 33/202* (2013.01); *B22C 9/062* (2013.01); *B22C 11/00* (2013.01); *B29C 33/302* (2013.01)

(58) Field of Classification Search
CPC ... B29C 33/202; B29C 45/26; B29C 45/2602; B29C 45/64; B29C 45/641; B29C 45/664
See application file for complete search history.

(56) References Cited

U.S. PATENT DOCUMENTS

2019/0002131 A1* 1/2019 Bienvenu .............. B23K 3/087

FOREIGN PATENT DOCUMENTS

JP   H04294116 A   10/1992
WO      9746371 A1  12/1997

OTHER PUBLICATIONS

"AIM Assembly v3" YouTube, https://www.youtube.com/watch?v=o6UL309w2AU, printed on Nov. 12, 2019.
Extended European Search Report dated Jul. 10, 2020 issued in corresponding EP Application No. 20158580.9, pp. 1-11.
Gunter Mennig: "Mold-Making Handbook" In: "Mold-Making Handbook", Oct. 1, 2013, Carl Hanser Verlag, pp. 75-75, Chapter 1.2.6.2.4.

* cited by examiner

*Primary Examiner* — Galen H Hauth
*Assistant Examiner* — Asha A Thomas
(74) *Attorney, Agent, or Firm* — Moore Intellectual Property Law, PLLC

(57) ABSTRACT

An assembly includes a first mold component defining a first portion of a mold cavity and a first slot. The first slot corresponds to a first portion of a retention channel. The assembly also includes a second mold component defining a second portion of the mold cavity and a second slot. The second slot corresponds to a second portion of the retention channel. The assembly also includes a connector having a cross-sectional shape corresponding to a cross-sectional shape of the retention channel. The connector has thermal expansion characteristics that are different from thermal expansion characteristics of the first and second mold components such that when the first and second mold components are in contact and the connector is inserted into the retention channel, heating the assembly causes differential thermal expansion of the connector and the mold components resulting in a clamping force between the mold components.

20 Claims, 8 Drawing Sheets

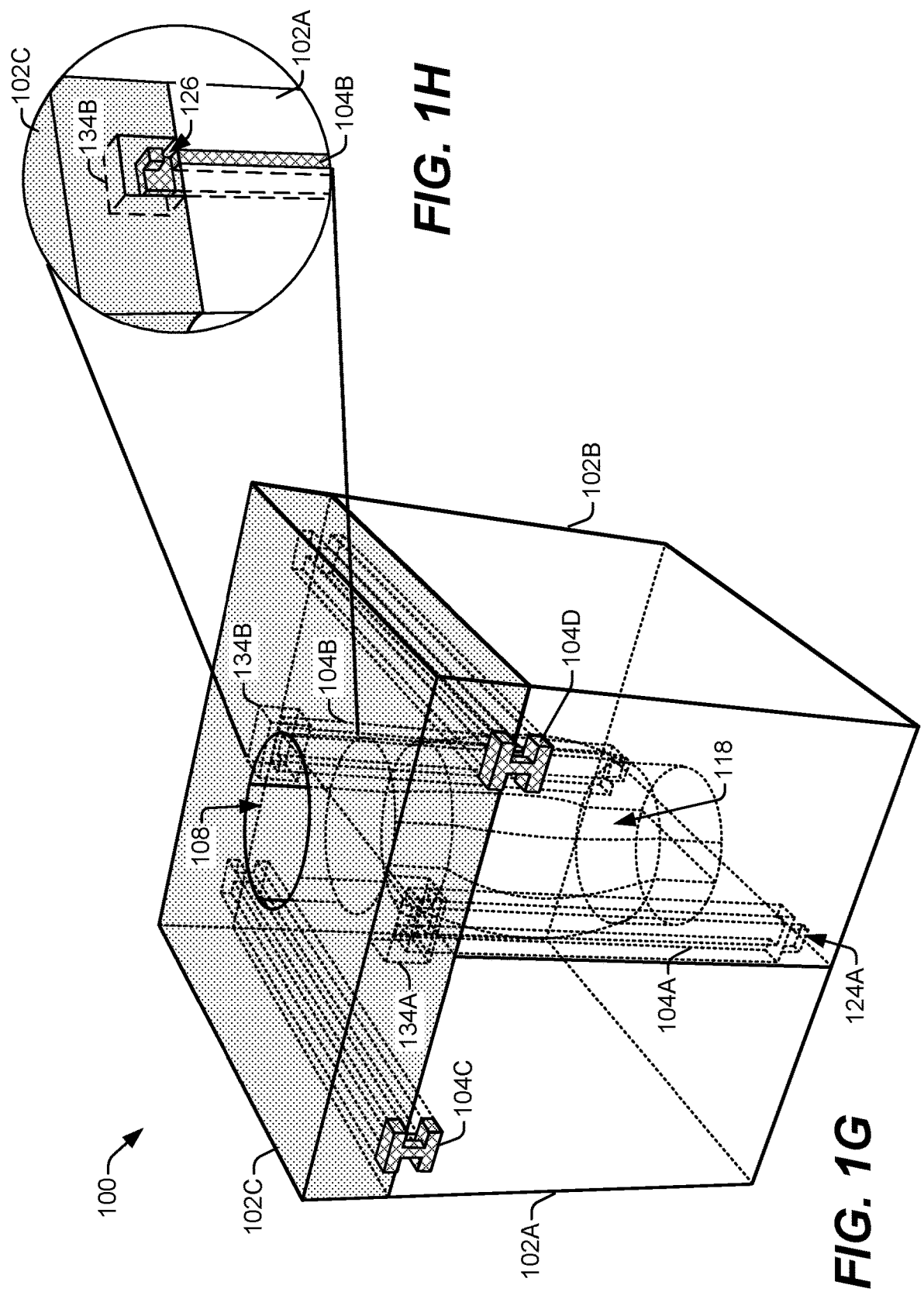

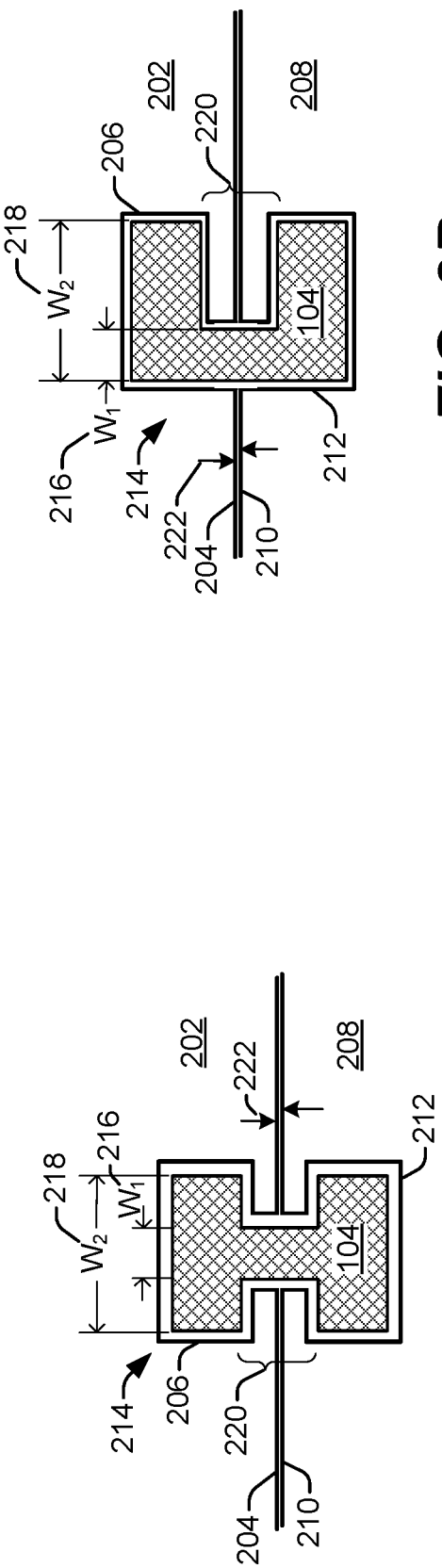
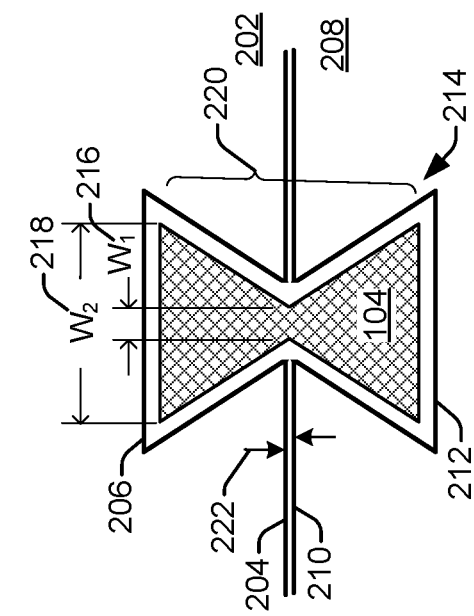
FIG. 2A
FIG. 2B
FIG. 2C

MOLD ASSEMBLY

FIELD OF THE DISCLOSURE

The present disclosure is generally related to mold assemblies.

BACKGROUND

Many industries use various forms of molding or casting to manufacture products. In general, molding, casting, and variants thereof, shape a material by placing the material within a mold cavity that defines that shape, causing the material to take on the shape of the cavity, and causing the material to maintain the shape after the material is removed from the cavity. As an example, the material placed in the mold cavity can be liquid (e.g., a molten metal, polymer melt, or one or more liquid reactants) in which case the material can flow within the mold cavity under the influence of gravity and/or externally applied pressure. In this example, after the mold cavity is filled, the liquid solidifies due to cooling, chemical reaction, or both, before the material is removed from the mold cavity. In other examples, solid materials (e.g., a material blank or pellets) can be placed in the mold cavity and caused to take on the shape of the mold cavity by external pressure, heat, or both.

After the material at least partially solidifies, the mold is opened and the molded part is removed or ejected. Opening the mold after it has been subjected to high temperatures and pressures and after the material is solidified within the mold cavity can be challenging. In some instances, bolts are used to assemble the mold before use, and the bolts can be difficult to remove from the mold due to temperature cycling, frequent reuse of the mold and bolts, fouling with the material being molded, etc. In such instances, significant manufacturing resources can be consumed in opening molds, removing molded parts, and subsequently preparing the mold for reuse.

SUMMARY

In a particular implementation, an assembly includes a first mold component defining a first portion of a mold cavity and defining a first slot in a first surface of the first mold component. The first slot in the first surface of the first mold component corresponds to a first portion of a first retention channel. The assembly also includes a second mold component defining a second portion of the mold cavity and defining a first slot in a first surface of the second mold component. The first slot in the first surface of the second mold component corresponds to a second portion of the first retention channel. The assembly further includes a first connector having a cross-sectional shape corresponding to a cross-sectional shape of the first retention channel. The first connector includes a first material having first thermal expansion characteristics. The first thermal expansion characteristics are different from thermal expansion characteristics of materials of the first and second mold components such that when the first connector is inserted into the first retention channel, heating the first mold component, the second mold component, and the first connector causes differential thermal expansion resulting in a clamping force between the first and second mold components.

In another particular implementation, an assembly includes a plurality of mold components and a plurality of connectors. The plurality of mold components includes a first mold component defining a first portion of a mold cavity and a first set of slots, a second mold component defining a second portion of the mold cavity and a second set of slots, and a third mold component defining a third portion of the mold cavity and a third set of slots. The plurality of connectors includes first, second, third, and fourth connectors. The first connector includes a first material and has a first cross-sectional shape corresponding to a combined cross-sectional shape of a first slot of the first set of slots and a first slot of the second set of slots. The second connector includes the first material and has a second cross-sectional shape corresponding to a combined cross-sectional shape of a second slot of the first set of slots and a second slot of the second set of slots. The third connector includes the first material and has a third cross-sectional shape corresponding to a combined cross-sectional shape of a third slot of the first set of slots and a first slot of the third set of slots. The fourth connector includes the first material and has a fourth cross-sectional shape corresponding to a combined cross-sectional shape of a third slot of the second set of slots and a second slot of the third set of slots. Thermal expansion characteristics of the plurality of connectors are different from thermal expansion characteristics of materials of the plurality of mold components such that when the plurality of connectors are inserted into respective retention channels and heat is applied to the plurality of mold components, resulting differential thermal expansion generates clamping forces between surfaces of the plurality of mold components.

In a particular implementation, a method includes forming an assembly of a plurality of mold components and a plurality of connectors. Forming the assembly includes aligning a first mold component and a second mold component, where the first mold component defines a first portion of a mold cavity and a first set of slots and the second mold component defines a second portion of the mold cavity and a second set of slots. Forming the assembly also includes sliding a first connector into a first retention channel corresponding to a first slot of the first set of slots and a first slot of the second set of slots. Forming the assembly further includes sliding a second connector into a second retention channel corresponding to a second slot of the first set of slots and a second slot of the second set of slots. Forming the assembly also includes aligning a third mold component with the first and second mold components, where the third mold component defines a third portion of the mold cavity and a third set of slots. Forming the assembly further includes sliding a third connector into a third retention channel corresponding to a third slot of the first set of slots and a first slot of the third set of slots and sliding a fourth connector into a fourth retention channel corresponding to a third slot of the second set of slots and a second slot of the second set of slots. The method also includes subjecting the assembly to heating to generate clamping forces between surfaces of the assembly due to differential thermal expansion of the assembly.

BRIEF DESCRIPTION OF THE DRAWINGS

FIGS. 1A, 1B, 1C, 1D, 1E, 1F, 1G, 1H, 1I, 1J are diagrams that illustrate various views and aspects of an example of a mold assembly.

FIGS. 2A, 2B, and 2C are diagrams that illustrate cross-sectional views of various connectors and corresponding retention channels of the mold assembly.

DETAILED DESCRIPTION

Figure 1A:
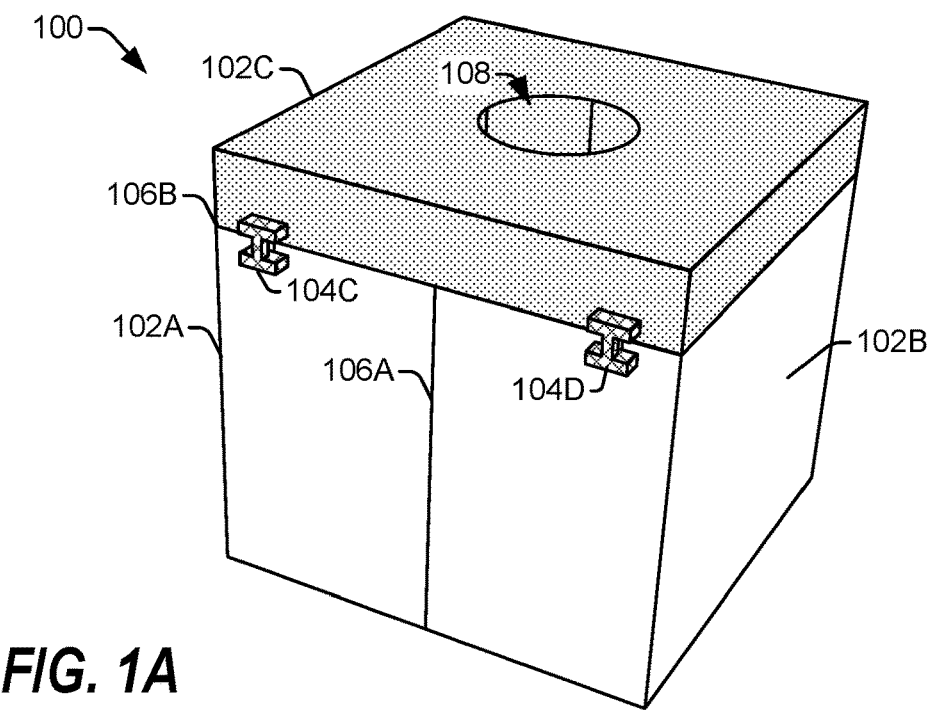

The present disclosure describes a multi-part mold assembly that enables quick assembly and disassembly while providing sufficient clamping pressure during a molding operation. The mold assembly disclosed herein can be assembled and disassembled faster and more ergonomically (e.g., with fewer repetitive motions) than molds that are assembled using bolts. Additionally, the connectors used for the mold assembly disclosed herein are less subject to fouling.

The mold assembly disclosed herein includes multiple mold components that, when assembled, define a mold cavity. One or more connectors slide into retention channels in the mold components. A retention channel for two mold components is defined by two slots, with one slot in each of the two mold components. Thus, when assembled, each connector is in a slot defined by a first mold component and a slot defined by a second mold component. The connectors and retention channels have corresponding cross-sectional shapes and each is shaped such that it is narrower in the middle (e.g., a region near the interface of the two mold components) than at the ends (e.g., a region furthest from the interface of the two mold components). For example, the connectors and retention channels can have an H-shaped cross-section, a C-shaped cross-section, an hourglass-shaped cross-section, or another cross-sectional shape that includes a concave region.

The connectors are formed of a different material (or different materials) than the mold components. In particular, the connectors are formed of a material (or materials) that has a different coefficient of thermal expansion than the material (or materials) used to form the mold components. In the embodiments illustrated and described herein, the coefficient of thermal expansion of the connectors is less than the coefficient of thermal expansion of the mold components. Accordingly, when the mold components and connectors are assembled and heated, the mold components expand more than the connectors. Due to the cross-sectional shapes of the connectors and retention channels, the difference in expansion generates a force that tends to clamp the mold components together. After the mold assembly is used to form a molded part, the mold assembly can be cooled to reduce or eliminate the clamping force due to thermal expansion, and the connectors can be removed from the retention channels to expose the mold cavity and the molded part.

As a specific example, at room temperature the connectors slide into the retention channels smoothly and without significant force. To illustrate, in some implementations, a user can slide a connector into a corresponding retention channel by hand (e.g., without tools). In some implementations, an anti-seize compound can be used to lubricate the retention channels and/or connectors to further reduce the required assembly and disassembly forces. The specific anti-seize compound used can be selected based on the materials used to form the mold components and the connectors, based on the temperature range of the molding operation, and desired properties of the anti-seize compound, such as viscosity or chemical compatibility with a material being molded.

After the connectors are in place, the mold assembly can be heated to process conditions. To illustrate, for a compression molding process using a thermoplastic polymer, the mold assembly can be heated to several hundred degrees Fahrenheit. The heat can be applied externally, or the mold assembly can include heating elements or other thermal exchange elements that are used to heat the mold assembly. As the mold assembly is heated, the mold components expand more than the connectors, which causes the connectors to clamp the mold components together.

After forming a molded part, the mold assembly is allowed (or caused) to cool. To illustrate, the mold assembly can be passively cooled or thermal exchange elements within or coupled to the mold assembly can be used to actively remove heat. As the mold assembly cools, the mold components contract more than the connectors, which releases the clamping force between the mold components. When the mold assembly has cooled sufficiently, the connectors will again slide within the retention channels and can easily be removed by either pulling on the ends of the connectors or tapping the connectors out from the other side. In some implementations, at least some of the mold components can include a punch hole to facilitate pushing a connector out of a retention channel.

During assembly and disassembly, the connectors are able to slide into or out of the retention channels. For example, no threads or other connection mechanisms are needed. Accordingly, assembling and disassembling the mold assembly is much faster than and more ergonomic than tightening and loosening retaining bolts. Additionally, the connectors do not have small features, such as threads, that can be fouled, damaged, or worn out through repeated use. Thus, a manufacturing process that uses the mold assembly disclosed herein can have a shorter cycle time for assembling and dissembling a mold than a process that uses a bolted together mold assembly, which decrease costs and/or increases throughput.

In the following, reference is made to features depicted in the drawings. In some of the drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1A, multiple mold components are illustrated and associated with reference numbers 102A, 102B, and 102C. When referring to a particular one of these mold components, such as a first mold component 102A, the distinguishing letter "A" is used. However, when referring to any arbitrary one of these mold components or to these mold components as a group, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third,"

etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. As used herein, "directly coupled" is used to describe two devices that are coupled (e.g., communicatively coupled, electrically coupled, or physically coupled) without intervening components. To illustrate, two components that are in direct physical contact with one another are "directly coupled" to one another.

Figure 1B:
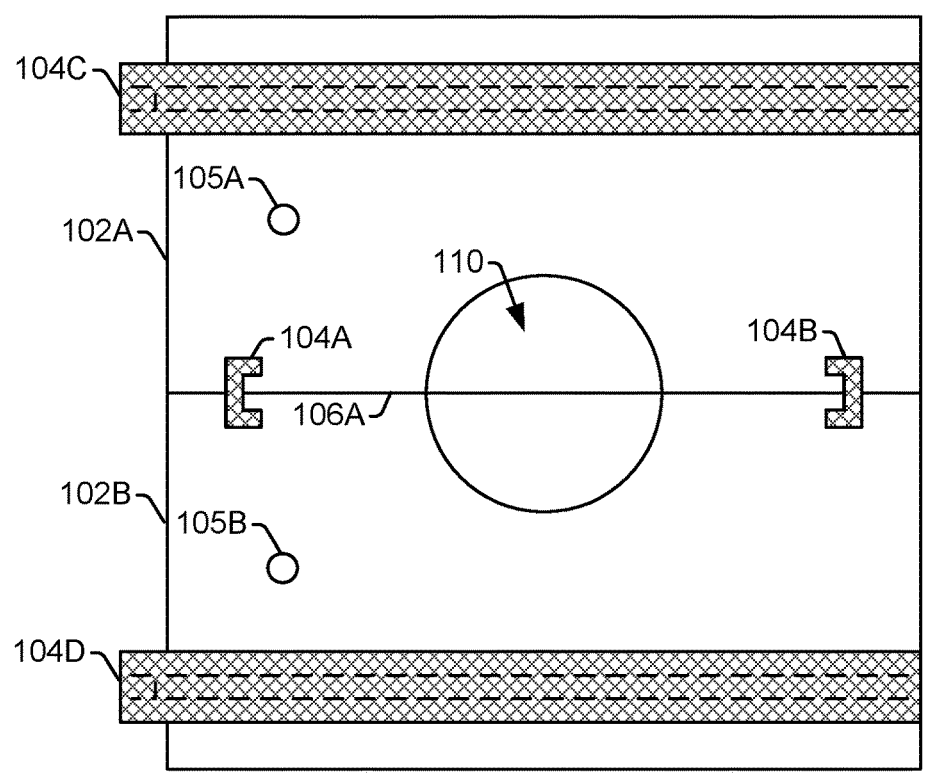
Figure 1C:
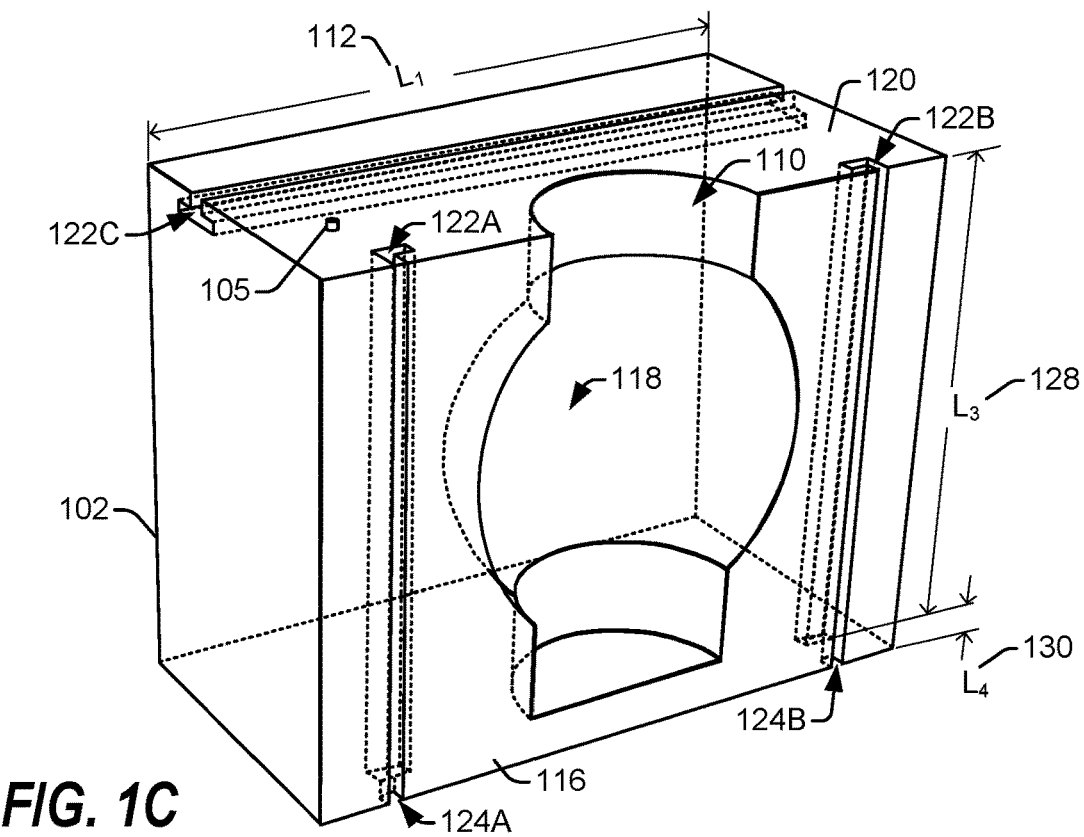
Figure 1D:
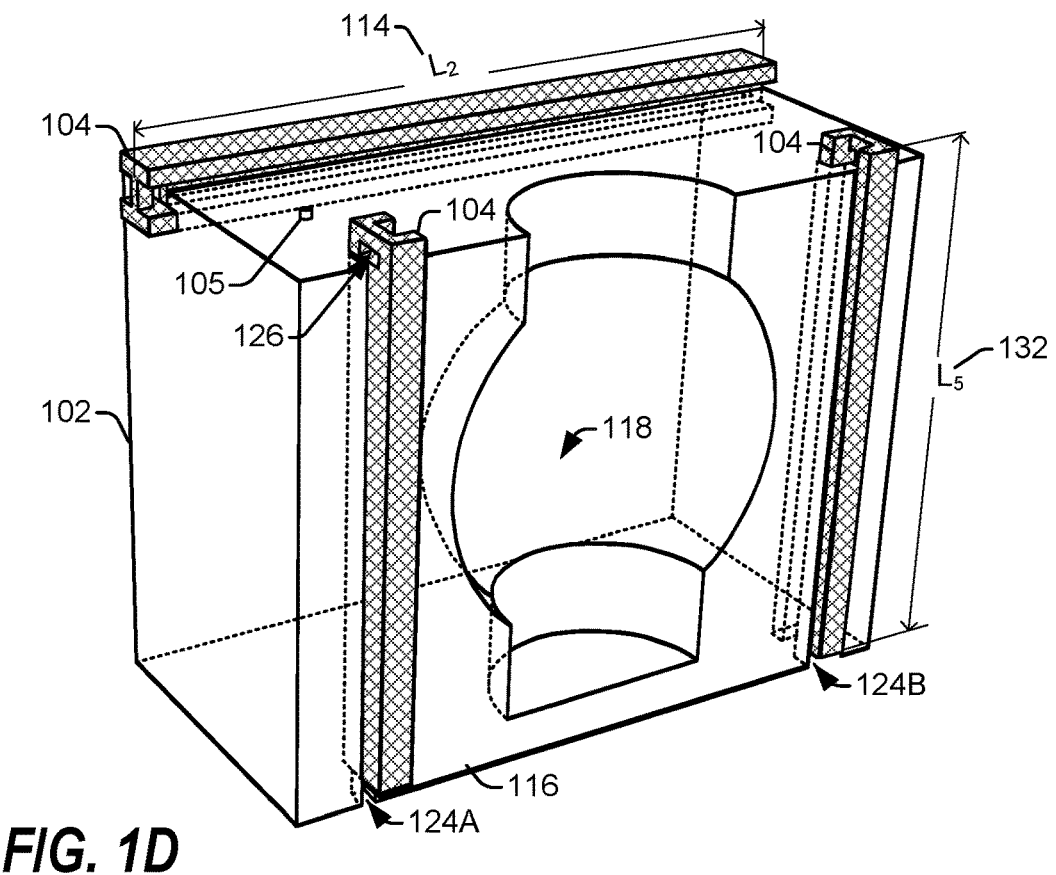
Figure 1E:
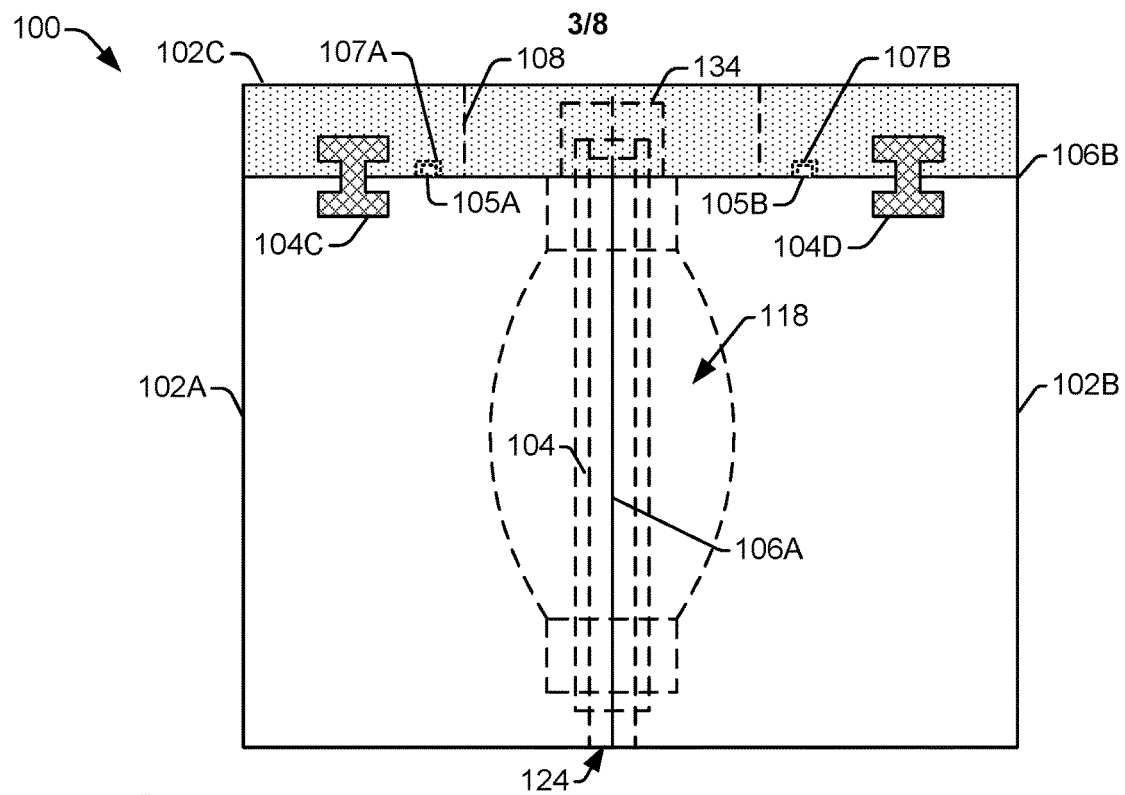
Figure 1F:
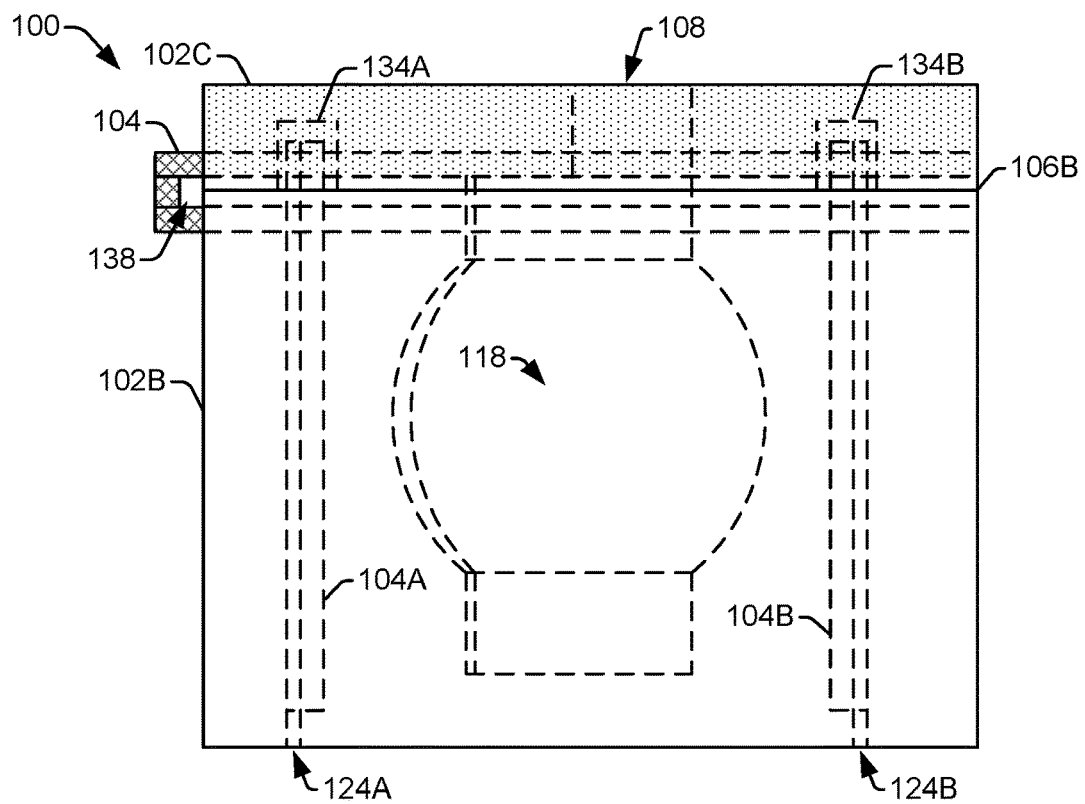
Figure 1I:
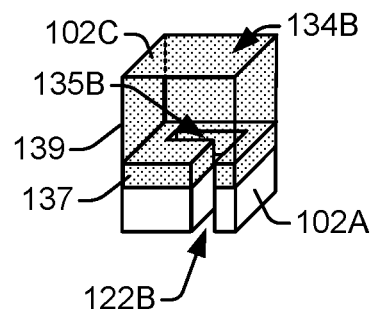
Figure 1J:
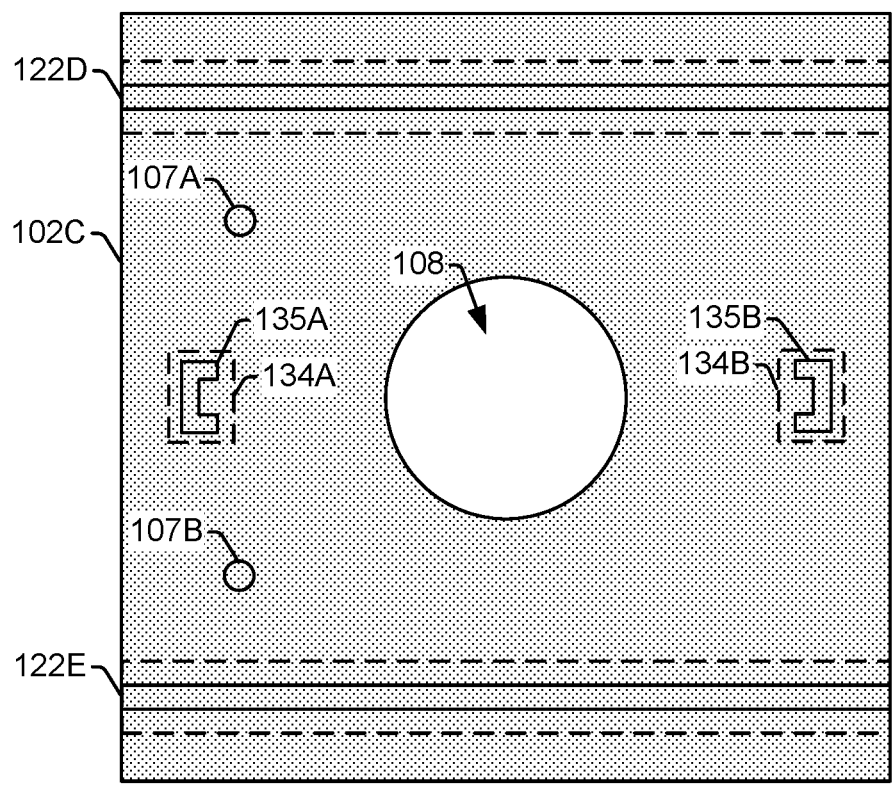

FIGS. 1A, 1B, 1C, 1D, 1E, 1F, 1G, 1H. 1I, and 1J are diagrams that illustrate various views and aspects of an example of a mold assembly 100. Specifically, FIG. 1A illustrates a perspective view of the mold assembly 100. For ease of reference, directions used in the following description (e.g., left, right, up, down, back, and front) are with reference to the orientation illustrated in FIG. 1A. These directions are not intended to be limiting and are used merely to facilitate description of the various aspects disclosed herein. FIG. 1B illustrates a top view of the mold assembly 100 with a top mold component (e.g., a third mold component 102C) removed. FIG. 1C illustrates a perspective view of one of the mold components 102, and FIG. 1D illustrates a perspective view of the mold components 102 of FIG. 1C with several connectors 104. FIG. 1E illustrates a front view of the mold assembly 100, and FIG. 1F illustrates a side view of the mold assembly 100. FIG. 1G illustrates a perspective view of the mold assembly 100 and a detailed cross-sectional view of a cavity in a mold component 102 to allow for expansion of a connector 104. FIGS. 1H and 1I shows examples of a cross-sectional view of a portion of the third mold component 102C along the mold line to illustrate additional details. FIG. 1J illustrates a bottom view of a particular example of the third mold component 102C according to a particular implementation.

The mold assembly 100 includes a plurality of mold components 102, such as a first mold component 102A, a second mold component 102B, and a third mold component 102C. The mold assembly 100 also includes a plurality of connectors 104, such as a first connector 104A, a second connector 104B, a third connector 104C, and a fourth connector 104D. Although the mold assembly 100 of FIGS. 1A-1J includes three mold components 102, in other implementations a mold assembly 100 includes only two mold components 102, and in yet other implementations, a mold assembly 100 includes more than three mold components 102. Additionally, although the mold assembly 100 of FIGS. 1A-1J includes four connectors 104, in other implementations, a mold assembly 100 includes more than four connectors 104 or fewer than four connectors 104. Further, the specific arrangement of the connectors 104 relative to the mold components 102 is different in other implementations.

In FIG. 1A, the first mold component 102A interfaces with the second mold component 102B at a mold line 106A. In this example, the first mold component 102A defines a first portion of the mold cavity 118 (illustrated in FIG. 1C), and the second mold component 102B defines a second portion of the mold cavity 118. The third mold component 102C sits atop the first and second mold components 102A, 102B and defines a third portion of the mold cavity 118 (e.g., an opening 108 that enables access to the mold cavity 118, such as to insert tooling, materials to be molded, etc.). As shown in FIG. 1B, a similar opening 110 is provided at the interface of the first and second mold components 102A, 102B to access the mold cavity 118.

As shown in FIG. 1B, the first mold component 102A is coupled to the second mold component 102B by the first connector 104A disposed in a first retention channel and by the second connector 104B disposed in a second retention channel. In some implementations, the mold components 102 include features to facilitate alignment of the mold components during assembly. For example, in FIG. 1B, the first mold component 102A includes a pin 105A and the second mold component 102B includes a pin 105B. In this example, the pin 105A aligns with a receptacle 107A (shown in FIGS. 1E and 1J) in the third mold component 102C, and the pin 105B aligns with a receptacle 107B (shown in FIGS. 1E and 1J) in the third mold component 102C. Other arrangements of the pins 105 and receptacles 107 can also be used. As shown in FIG. 1A, the third mold component 102C is coupled to the first mold component 102A by the third connector 104C disposed in a third retention channel and to the second mold component 102B by the fourth connector 104D disposed in a fourth retention channel.

FIGS. 1C and 1D illustrate how the connectors 104 interface with the mold components 102. The mold component 102 of FIG. 1C includes a body formed of a particular material, such as a ceramic, a metal, or an alloy. The body of the mold component 102 defines a portion of the mold cavity 118 and a plurality of slots 122, such as a first slot 122A, a second slot 122B, and a third slot 122C. The first slot 122A and the second slots 122B are defined in a first surface 116 (e.g., a side surface in the view shown) of the mold component 102, and the third slot 122C is defined in a second surface 120 (e.g., a top surface in the view shown) of the mold component 102. The first surface 116 and the second surface 120 are each configured to interface with (e.g., contact) a mating surface of another mold component 102. For example, if the mold component 102 of FIG. 1C corresponds to the first mold component 102A of FIG. 1A, then the second surface 120 is configured to interface with a first surface of the third mold component 102C of FIG. 1A and the first surface 116 is configured to interface with a first surface of the second mold component 102B of FIG. 1A. In another example, if the mold component 102 of FIG. 1C corresponds to the second mold component 102B of FIG. 1A, then the second surface 120 is configured to interface with the first surface of the third mold component 102C of FIG. 1A and the first surface 116 is configured to interface with a first surface of the first mold component 102A of FIG. 1A.

Each of the slots 122 is configured to receive a connector 104. In particular, each slot 122 has a cross-sectional shape corresponding to one half of a retention channel, and each retention channel has a cross-sectional shape that is geometrically similar (within manufacturing tolerances) to the cross-sectional shape of a corresponding connector 104. In this context, geometrically similar means that either shape can be made identical to the other shape merely by uniform scaling, translation, rotation, and/or reflection. The cross-sectional shape of a particular retention channel is enough larger than the cross-sectional shape of a corresponding connector 104 to allow the connector 104 to slide into the retention channel when the mold components 102 and the connector 104 are at room temperature.

To simplify disassembly of the mold assembly 100, each connector 104 can be longer than its respective retention channel. For example, as shown in FIG. 1C, the slot 122C has a length ("$L_1$") 112 that extends across an entire width of the mold component 102. As shown in FIG. 1D the connector 104 disposed in the slot 122C has a length ("$L_2$") 114 which is greater than length 112 of the slot 122C. The greater length of the connector 104 with respect to the slot 122 allows a portion of the connector 104 to extend past the body of the mold component 102 to facilitate extraction of the connector 104 from the mold assembly 100. In some implementations, one or more of the connectors 104 includes a hook or hole (such as the hole 126 shown in FIG. 1D or the hole 138 shown in FIG. 1F) to further simplify extraction of the connector 104 from the mold assembly 100.

In some implementations, some or all of the slots 122 do not extend across an entire side of the mold component 102. For example, in FIG. 1C, the slot 122B extends a first portion of the distance from the top of the mold component 102 toward the bottom of the mold component 102, and a punch hole 124B extends a remaining portion of the distance (e.g., from the bottom of the mold component 102 to the slot 122B). Similarly, the slot 122A extends a portion of the distance from the top of the mold component 102 to the bottom of the mold component 102, and a punch hole 124A extends the remaining portion of the distance (e.g., from the bottom of the mold component 102 to the slot 122A). To illustrate, the height of the mold component 102 (in the orientation illustrated in FIG. 1C) is equal to a length 128 ("$L_3$") of the slot 122B plus a length 130 ("$L_4$") of the punch hole 124B. As shown in FIG. 1D, a connector 104 associated with the slot 122B is longer than the slot 122B. For example, the connector 104 associated with the slot 122C has a length 132 ("$L_5$") that is greater than the length 128. The punch holes 124 may further simplify extraction of the connector 104 from the mold assembly 100. For example, a user or machine can push or strike the bottom of the connector 104 (in the orientation shown in FIG. 1D) to cause the connector 104 to move upward and out of the slot 122.

Where surfaces of two mold components 102 are held together by a connector 104, the connector 104 is positioned such that a major axis (e.g., the length) of the connector 104 is substantially parallel with a mold line 106 formed by the two mold components 102. For example, the major axis of the slot 122C is parallel to the second surface 120, which serves as one side of the mold line between the mold component 102 of FIG. 1C and another mold component, such as the third mold component 102C of FIG. 1A. In this arrangement, the major axis of the connector 104 is free at each end. For example, neither end of a connector 104 in the slot 122C extends toward or intersects a surface of another mold component 102.

However, in some implementations, a major axis of a connector 104 can extend toward or intersect the surface of another mold component 102. For example, the major axis of the connector 104 in the slot 122A of FIG. 1D extends past the second surface 120 of the mold component 102. Thus, when the second surface 120 is in contact with another mold component 102, such as the third mold component 102C of FIG. 1A, the major axis of the connector 104 extends toward or intersects that other mold component 102. In such implementations, a recess 134 (illustrated in FIGS. 1E-1J) can be provided in the other mold component to accommodate an end of the connector 104. For example, FIGS. 1E-1J illustrate recesses 134 in the third mold component 102C to accommodate the ends of the connectors 104A and 104B.

FIG. 1J illustrates a bottom view of a particular example of the third mold component 102C according to a particular implementation. FIG. 1J illustrates slots 122D and 122E in the third mold component 102C that together with the slots 122C of the first and second mold components 102A and 102B define retention channels to couple the third mold component 102C to the first and second mold components 102A and 102B. The third mold component 102C of FIG. 1J also illustrates recesses 134A having openings 135 as described further with reference to FIG. 1I.

FIGS. 1E-1G provide additional views of the various features described above to clarify the positions and relationships among the various features when the mold assembly 100 is assembled. FIGS. 1H and 1I shows examples of a cross-sectional view along the mold line 106A to illustrate additional details of one of the recesses 134 in relation to other features. In FIG. 1H, the recess 134B that is illustrated is a straight-walled mortise, e.g., a hole in the shape of a rectangular prism or a cylinder. For example, viewed from the bottom of the third mold component 102C, the recess 134B of FIG. 1H is rectangular or circular. In FIG. 1I, recess 134B includes a first portion 139 that has the shape of a rectangular prism or cylinder, and a second portion 137 defining an opening 135B having a shape corresponding to the shape of the connector 104B. In other implementations, the recess 134 can have another shape. One benefit of the recess 134B of FIG. 1I is that the opening 135B can facilitate alignment of the third mold component 102C with the first and second mold components 102A and 102B. Thus, when the recess 134B of FIG. 1I is used, the receptacles 107 and pins 105 can be omitted, or alignment provided by the receptacles 107 and pins 105 can be supplemented by the recess 134B of FIG. 1I.

In a particular implementation, the mold assembly 100 is assembled by aligning the first mold component 102A and the second mold component 102B to form the mold cavity 118. When the first and second mold components 102A, 102B are aligned, the slots 122A and 122B of each of the first and second mold components 102A, 102B are aligned to define retention channels, and a connector 104 is disposed in each retention channel. For example, a slot 122A of the first mold component 102A is aligned with a slot 122A of the second mold component 102B to form a first retention channel, and a slot 122B the first mold component 102A is aligned with a slot 122B of the second mold component 102B to form a second retention channel. In this example, the first connector 104A is disposed in the first retention channel, and the second connector 104B is disposed in the second retention channel.

Continuing this example, after the first and second mold components 102A, 102B are coupled together by the first and second connectors 104A, 104B, the third mold component 102C is aligned with the first and second mold components 102A, 102B. To illustrate, the opening 108 of the third mold component 102C is aligned with the opening 110 defined by the first and second mold components 102A, 102B. Additionally, or in the alternative, the recesses 134 of the third mold component 102C are aligned with the first and second connectors 104A, 104B. Further, slots of the third mold component 102C are aligned with corresponding slots 122C of the first and second mold components 102A, 102B to define retaining channels, and connectors 104 are disposed in the retaining channels. For example, the third connector 104C is disposed in a retention channel defined by a slot of the first mold component 102A and a slot of the third mold component 102C, and the fourth connector 104D is disposed in a retention channel defined by a slot of the second mold component 102B and a slot of the third mold component 102C.

After the mold assembly 100 is assembled, as described above, the mold assembly 100 can be heated (e.g., during a pre-heating operation or as part of a normal molding operation process flow). Heating the mold assembly 100 causes the mold components 102 and connectors 104 to expand. However, because the mold components 102 and connectors 104 are formed of different materials and have different coefficients of thermal expansion, the mold components 102 and connectors 104 expand by different amounts for each incremental temperature change. As further explained with reference to FIGS. 2A-2C, the cross-sectional shape of the connectors 104 is selected to cause the differential thermal expansion to generate a clamping force between adjacent mating surfaces of the mold components. For example, differential expansion of the connector 104A, the first mold component 102A and the second mold component 102B causes a clamping force between the first surface 116 of the first mold component 102A and an adjacent surface of the second mold component 102B.

After a molding operation is complete, the mold assembly 100 and a molded product disposed therein can be allowed to cool. Cooling the mold assembly 100 causes the mold components 102 and connectors 104 to contract (at different rates based on the respective coefficients of thermal expansion) until the connectors 104 can be removed from the retention channels to disassemble the mold assembly 100.

FIGS. 2A, 2B, and 2C are diagrams that illustrate cross-sectional views of various connectors 104 and corresponding retention channels 214 of the mold assembly 100. FIG. 2A illustrates a connector 104 with an H-shaped cross-section in a retention channel 214 with a corresponding H-shaped cross-section, FIG. 2B illustrates a connector 104 with a C-shaped cross-section in a retention channel 214 with a corresponding C-shaped cross-section, and FIG. 2C illustrates a connector 104 with an hourglass-shaped cross-section in a retention channel 214 with a corresponding hourglass-shaped cross-section.

Each retention channel 214 corresponds to an aligned pair of slots 206, 212 of a pair of mold components 202, 208. The mold components 202, 208 can correspond to any two mold components 102 of the mold assembly 100 that are joined by a connector 104 of FIGS. 1A-1G. The mold component 202 includes a mating surface 204 that is configured to contact a mating surface 210 of the mold component 208. When the mating surfaces 204, 210 are in contact and the slots 206, 212 are aligned, the slots 206, 212 together form or define the retention channel 214.

The connector 104 has a shape that corresponds to the retention channel 214. The illustrated cross-sectional shapes of the connector 104 and retention channel 214 are selected so that differential thermal expansion of a connector 104 and its associated mold components 202, 208 results in a clamping force 222 that urges that mating surfaces 204, 210 together. In the illustrated examples, each of the cross-sectional shapes has a concave region 220, e.g., an area where part of each mold component 202, 208 is between two parts of the connector 104. The concave region 220 results from shaping the connector 104 (and the corresponding retention channel 214) to be relatively narrow at each mating surface 204, 210 and wider in an area further away from the mating surface 204, 210. For example, the connector 104 has a width 216 ("$W_1$") near the mating surfaces 204, 210 and a width 218 ("$W_2$") distant from the mating surface 204 (e.g., at a bottom of the slot 212 and a top of the slot 206 in the orientation illustrated in FIGS. 2A-2C). In this example, the width 216 is smaller than the width 218. Although three examples of cross-sectional shapes that include concave regions are illustrated in FIGS. 2A-2C, other cross-sectional shapes with concave regions could be used. To illustrate, a Z-shaped cross-sectional shape could be used.

The retention channel 214 should have generally the same cross-sectional shape as the corresponding connector 104. In some implementations, the retention channel 214 and the corresponding connector 104 have geometrically similar cross-sectional shapes. In other implementations, the cross-sectional shape of the retention channel 214 can vary somewhat from the cross-sectional shape of the connector 104 as long as the connector 104 is able to slide in the retention channel 214 at a first temperature (e.g., a relatively low temperature, such as room temperature) and is able to generate the clamping force 222 between the mating surfaces 204, 210 at a second temperature (e.g., a relatively high temperature, such as a thermoplastic polymer melt temperature).

The relative dimensions of the connector 104 and the corresponding retention channel 214 will depend on process conditions associated with the molding operation and the coefficients of thermal expansion of the mold components 202, 208 and the connector 104. For example, for molding operations that use high internal pressures, such as compression molding, the clamping force 222 needs to be relatively strong to prevent distortion of the mold cavity (e.g., separation along a mold line) due to pressure exerted by the molding apparatus. Such a large clamping force 222 can be achieved by selecting materials that have relatively large differences in the coefficient of thermal expansion for the operating temperature range, by designing the retention channel 214 and connector 104 to have a large concave region 220, or both. For other types of molding operations, such as casting of molten metals, the process temperatures can be so extreme that a relatively small difference in the coefficients of thermal expansion is sufficient to provide the needed clamping force 222.

In some implementations, a utility of the mold assembly 100 can be modified by using different connectors 104. For example, mold components 102 are generally carefully machined and expensive. If process conditions are changed, e.g., to enable use of a different molding material, it can be time consuming and expensive to manufacture new mold components 102. In some implementations, the mold components 102 disclosed herein can be used in a wide variety of process conditions by changing only the connectors 104 used to join the mold components 102. As a specific example, a mold assembly 100 initially designed for use with a particular process can include mold components 102 and connectors 104 that are selected to provide a particular clamping force 222 at a particular process temperature. As explained above, the clamping force 222 is related to the difference in the coefficients of thermal expansion of the mold components 102 and the connectors 104. In this example, if the process conditions are modified (e.g., to increase the process temperature) after the initial design, the connectors 104 from the initial design may provide too much clamping force 222 at the new process temperature, which can result in damage to the connectors 104 or the mold components 102. Accordingly, new connectors 104 can be obtained to provide the correct clamping force 222 at the new process temperature. The new connectors 104 can be formed of a material that has a coefficient of thermal expansion that is more similar to the coefficient of thermal expansion of the mold components than the connectors 104 of the initial design. Alternatively, or in addition, the shape of the new connectors 104 can be modified (e.g., by lengthening the portion of the connector 104 in the concave region 220 to reduce the clamping force 222.

Figure 3:
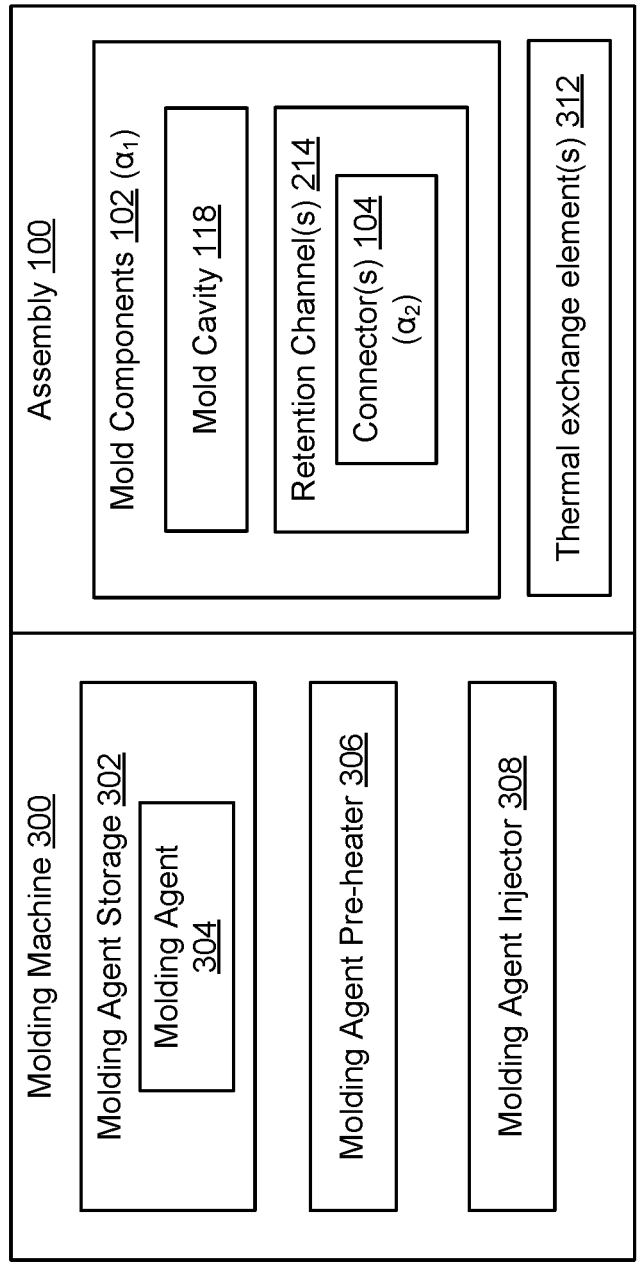
FIG. 3 is a diagram that illustrates an example of a system that includes the mold assembly.

FIG. 3 is a diagram that illustrates an example of a system that includes the mold assembly 100. In FIG. 3, the mold assembly 100 is coupled to a molding machine 300. The mold assembly 100 of FIG. 3 includes a plurality of mold components 102 assembled to define a mold cavity 118 and one or more retention channels 214. Each retention channel 214 includes a connector 104. The mold components 102 are formed of or include one or more materials that have a first coefficient of thermal expansion ($\alpha_1$), and the one or more connectors 104 are formed of or include one or more materials that have a second coefficient of thermal expansion ($\alpha_2$). The first coefficient of thermal expansion is different from the second coefficient of thermal expansion. For example, the first coefficient of thermal expansion is greater than the second coefficient of thermal expansion.

In the example illustrated in FIG. 3, the molding machine 300 includes a molding agent storage vessel 302 that stores a molding agent 304. The molding agent 304 is any material that is to be shaped using the mold assembly 100. As an example, the molding agent 304 can include a polymer, a set of reactants (e.g., a monomer and an initiator), a metal, or combinations of multiple compatible materials, such as two or more metals, or two or more polymers. The molding agent 304 generally includes a condensed phase material (e.g., a liquid or a solid). If the molding agent 304 includes a solid, the solid can include discrete units (e.g., fibers or pellets) that are used in bulk to form a molded product, or the solid can include a pre-form that is further shaped by the molding process. If the molding agent 304 includes a liquid, the liquid can undergo a physical process (e.g., a phase change), a chemical process (e.g., polymerization or cross-linking), or both, during the molding operation to form the molded product.

The molding machine 300 in FIG. 3 also includes a molding agent pre-heater 306 and a molding agent injector 308. The molding agent injector 308 is configured to inject or otherwise insert a shot of or a sample of the molding agent 304 into the mold cavity 118 of the mold assembly 100. For example, the molding agent injector 308 may be configured to insert the molding agent 304 into the mold cavity 118 through the opening 108 of FIG. 1A of the fully assembled mold assembly 100. In another example, the molding agent injector 308 may be configured to insert the molding agent 304 into the mold cavity 118 through the opening 110 of FIG. 1B before the third mold component 102C is coupled to the first and second mold components 102A, 102B. In some implementations, the molding agent 304 is heated before it is disposed in the mold cavity 118. In such implementations, the molding agent pre-heater 306 performs this heating operation. In other implementations, the molding agent 304 is not heated before it is disposed in the mold cavity 118. In such implementations, the molding agent pre-heater 306 can be omitted.

In the example illustrated in FIG. 3, one or more thermal exchange elements 312 are coupled to or disposed within the mold assembly 100. The thermal exchange element(s) 312 can be configured to heat the mold assembly 100, to cool the mold assembly 100, or heat at some times and cool at other times.

The molding machine 300 and the mold assembly 100 can be used for many different types of manufacturing operations, such as compression molding, injection molding, blow molding, rotational molding, or casting. Further, the mold assembly 100 can include other features to facilitate certain manufacturing operations. To illustrate, the mold assembly 100 is described above as including a single mold cavity 118; however, in some implementations, the mold assembly 100 can include more than one mold cavity. In such implementations, the mold assembly 100 can include runners or stringers between the mold cavities. As another example, the mold assembly 100 can include vent holes to allow air displaced by the molding agent 304 to escape from the mold cavity 118. As yet another example, the mold assembly 100 can also include openings or other features for ejector pins to eject a molded part from the mold cavity 118.

Figure 4:
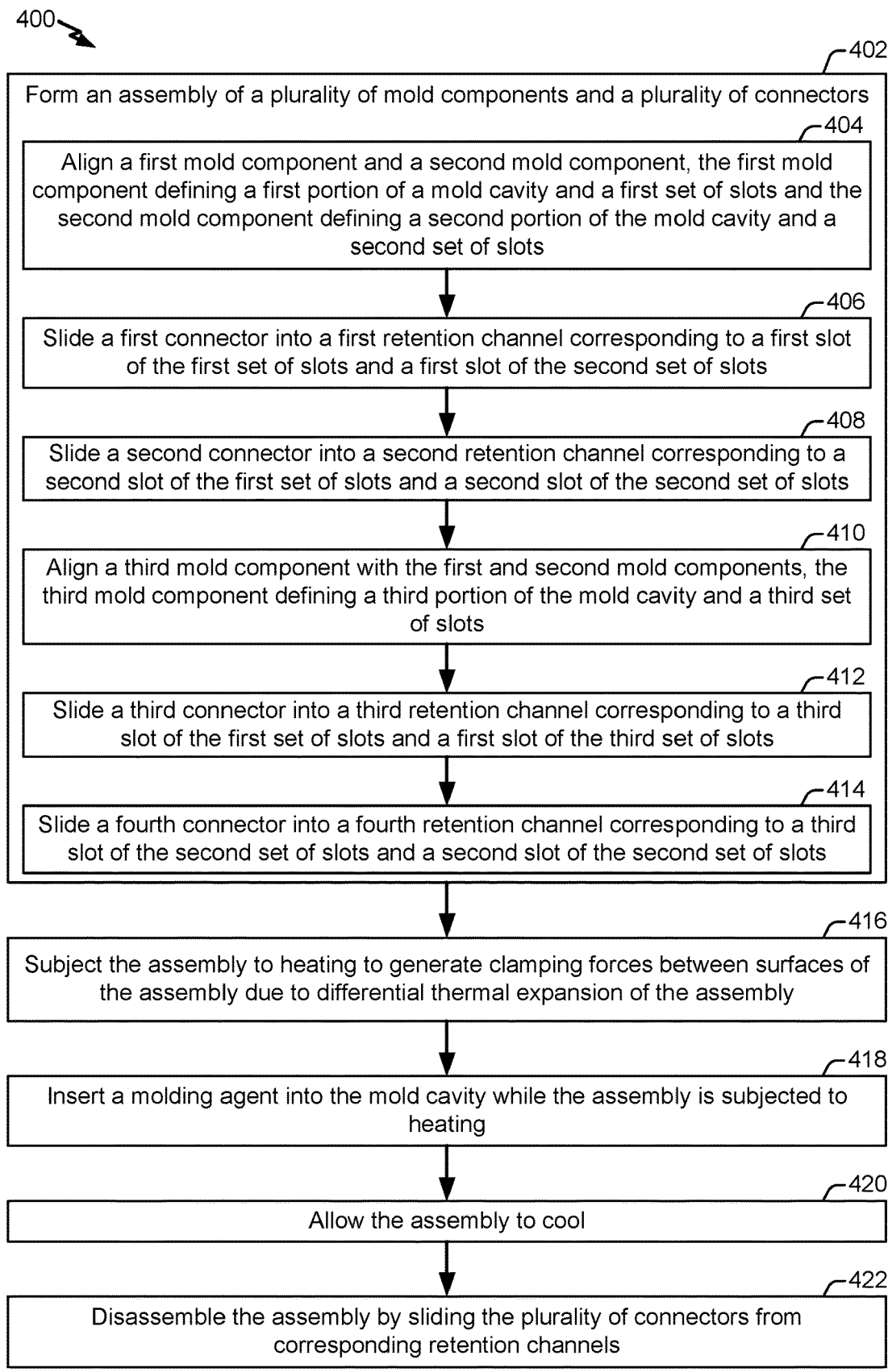
FIG. 4 is a flow chart of an example of a method of using the mold assembly.

FIG. 4 is a flow chart of an example of a method 400 of using the mold assembly 100. The method 400 includes, at 402, forming an assembly (e.g., the mold assembly 100) of a plurality of mold components and a plurality of connectors. Forming the assembly includes, at 404, aligning a first mold component and a second mold component. The first mold component defines a first portion of a mold cavity and a first set of slots, and the second mold component defines a second portion of the mold cavity and a second set of slots. For example, the first mold component can include or correspond to the first mold component 102A of FIGS. 1A-1G (defining the first set of slots 122A, 122B and 122C), and the second mold component can include or correspond to the second mold component 102B. In this example, the first and second mold components 102A, 102B each define a portion of the mold cavity 118.

Forming the assembly also includes, at 406, sliding a first connector into a first retention channel corresponding to a first slot of the first set of slots and a first slot of the second set of slots, and at 408, sliding a second connector into a second retention channel corresponding to a second slot of the first set of slots and a second slot of the second set of slots. For example, an operator or the molding machine 300 can slide the first connector 104A into a retention channel corresponding to the first slot 122A of the first mold component 102A and a first slot 122A of the second mold component 102B and can slide the second connector 104B into a retention channel corresponding to the second slot 122B of the first mold component 102A and a second slot 122B of the second mold component 102B.

In some implementations, forming the assembly further includes, at 410, aligning a third mold component with the first and second mold components, where the third mold component defines a third portion of the mold cavity and a third set of slots. In such implementations, forming the assembly also includes, at 412, sliding a third connector into a third retention channel corresponding to a third slot of the first set of slots and a first slot of the third set of slots, and at 414, sliding a fourth connector into a fourth retention channel corresponding to a third slot of the second set of slots and a second slot of the second set of slots. For example, the third mold component can correspond to or include the third mold component 102C of FIGS. 1A-1G, which defines a portion of the mold cavity 118 and includes slots corresponding to the third slots 122C of the first and second mold components 102A, 102B. In this example, the operator or the molding machine 300 can slide the third connector 104C into a retention channel corresponding to the third slot 122C of the first mold component 102A and a corresponding third slot 122C of the third mold component 102C and can slide the fourth connector 104D into a retention channel corresponding to a third slot 122C of the second mold component 102B and a corresponding third slot 122C of the third mold component 102C.

After the assembly is formed, the method 400 includes, at 416, subjecting the assembly to heating to generate clamping forces between surfaces of the assembly due to differential thermal expansion of the assembly. For example, as explained with reference to FIGS. 1A-1G and 2A-2C, differential thermal expansion of the connectors 104 and mold components 102 results in clamping forces 222 between mold components 102 that are connected by the connectors 104 when the mold assembly 100 is heated.

In some implementations, the method 400 also includes, at 418, after forming the assembly, inserting a molding agent into the mold cavity while the assembly is subjected to heating. For example, the operator of the molding machine 300 of FIG. 3 can dispose the molding agent 304 in the mold cavity 118 to form a molded product. In some implementations, the mold assembly 100 is pre-heated before the molding agent 304 is disposed in the mold cavity 118. In other implementations, such as when the molding agent 304 is molten (e.g., a room-temperature solid heated to a liquid state for molding), the molding agent 304 itself may sufficiently heat the mold assembly 100 so that pre-heating the mold assembly 100 is not required.

The method 400 also includes, at 420, after inserting the molding agent into the mold cavity, allowing the assembly to cool. For example, the mold assembly 100 can be passively cooled (e.g., by convection, conduction, and/or radiation into the ambient environment) or actively cooled. When the mold assembly 100 is actively cooled, the active cooling can be via an external cooling mechanism, such as a submersion in a cooling bath or circulation of a cooling fluid through channels in the mold components 102 or connectors 104, or the active cooling can be via one or more thermal exchange elements 312 embedded within or coupled to the mold components 102 or connectors 104.

After cooling the assembly to reduce the clamping forces, the method 400 includes, at 422, disassembling the assembly by sliding the plurality of connectors from corresponding retention channels. For examples, the operator or the molding machine 300 can remove a connector 104 from a respective retention channel of the mold assembly 100 by grasping an end of the connector 104, by inserting a tool or hook through a hole 126 or 138 of the connector 104, by tapping an end of the connector 104 via a punch hole 124, or a combination thereof.

One benefit of the method 400 is that the mold assembly 100 can be quickly and easily assembled and disassembled. For example, assembly and disassembly of the mold assembly 100 is faster and more ergonomic (e.g., involves fewer repetitive motions) than assembly and disassembly of molds that use bolts to provide clamping forces. Additionally, the connectors 104 used for the mold assembly 100 disclosed herein are less subject to fouling than bolts.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. As another example, the connectors 104 can be coupled to an external surface of the mold components 102, rather than within slots of the mold components 102. For example, a connector 104 having a lower coefficient of thermal expansion than the mold components 102 and defining a strap or clip can be coupled to an external surface of the mold components 102. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An assembly comprising:
a first mold component defining a first portion of a mold cavity, wherein the first mold component includes a first slot in a first surface of the first mold component, and wherein the first slot in the first surface of the first mold component corresponds to a first portion of a first retention channel;
a second mold component defining a second portion of the mold cavity, wherein the second mold component includes a second slot in a first surface of the second mold component, and wherein the second slot in the first surface of the second mold component corresponding to a second portion of the first retention channel; and
a first connector configured to be positioned in the first retention channel, wherein the first retention channel is formed when the first slot is aligned with the second slot, wherein a cross-sectional shape of the first connector in a plane perpendicular to a longitudinal axis of the first connector corresponds to a cross-sectional shape of the first retention channel in a plane perpendicular to a longitudinal axis of the first retention channel, wherein a first portion of the cross-sectional shape of the first connector at a particular position along a length of the first connector positioned in the first retention channel is positioned in the first slot and not in the second slot, wherein a second portion of the cross-sectional shape of the first connector at the particular position is positioned in the second slot and not in the first slot, wherein the first connector comprises a first material having first thermal expansion characteristics, and wherein the first thermal expansion characteristics differ from thermal expansion characteristics of materials of the first mold component and the second mold component such that when the first connector is inserted into the first retention channel, application of heat to the first mold component, the second mold component, and the first connector causes thermal expansion resulting in a clamping force between the first mold component and the second mold component.

2. The assembly of claim 1, wherein the cross-sectional shape of the first retention channel corresponds to a C shape, an H shape, or an hourglass shape.

3. The assembly of claim 1, wherein the cross-sectional shape of the first connector defines a concave region.

4. The assembly of claim 1, wherein the first mold component further defines a third slot in the first surface of the first mold component, wherein the third slot in the first surface of the first mold component corresponds to a first portion of a second retention channel, wherein the second mold component further defines a fourth slot in the first surface of the second mold component, and wherein the fourth slot in the first surface of the second mold component corresponding to a second portion of the second retention channel, and further comprising a second connector comprising the first material and having a cross-sectional shape corresponding to a cross-sectional shape of the second retention channel.

5. The assembly of claim 1, further comprising:
a third mold component defining a third portion of the mold cavity and a third slot in a first surface of the third mold component, wherein the third slot in the first surface of the third mold component corresponds to a first portion of a third retention channel, wherein the first mold component further defines a fourth slot in a second surface of the first mold component, and wherein the fourth slot in the second surface of the first mold component corresponds to a second portion of the third retention channel; and
a third connector having a cross-sectional shape corresponding to a cross-sectional shape of the third retention channel, wherein the third connector comprises the first material or another material having thermal expansion characteristics different from the thermal expansion characteristics of the materials of the first and third mold components.

6. The assembly of claim 5, wherein the third mold component further defines a fifth slot in the first surface of the third mold component, the fifth slot in the first surface of the third mold component corresponding to a first portion of a fourth retention channel, and wherein the second mold component further defines a sixth slot in a second surface of the second mold component, the sixth slot in the second surface of the second mold component corresponding to a second portion of the fourth retention channel, and further comprising a fourth connector having a cross-sectional shape corresponding to a cross-sectional shape of the fourth retention channel, the fourth connector comprising the first material or the other material having thermal expansion characteristics different from the thermal expansion characteristics of the materials of the second and third mold components.

7. The assembly of claim 5, wherein the third connector has a length greater than a length of the third retention channel.

8. The assembly of claim 5, wherein the third mold component further defines a recess to accommodate an end of the first connector.

9. The assembly of claim 1, wherein the first connector has a length greater than a length of the first retention channel.

10. The assembly of claim 1, wherein the first slot in the first surface of the first mold component extends a first portion of a distance across the first surface of the first mold component, and wherein the first mold component further defines a punch hole extending a remaining portion of the distance.

11. The assembly of claim 1, wherein the first connector comprises a through hole at one end to facilitate extraction of the first connector from the first retention channel.

12. The assembly of claim 1, further comprising one or more thermal exchange elements coupled to or within at least one of the first mold component or the second mold component.

13. An assembly comprising:
a plurality of mold components including:
a first mold component defining a first portion of a mold cavity and a first set of slots;
a second mold component defining a second portion of the mold cavity and a second set of slots; and
a third mold component defining a third portion of the mold cavity and a third set of slots; and
a plurality of connectors including:
a first connector comprising a first material, wherein a first retention channel is formed when a first slot of the first set of slots is aligned with a first slot of the second set of slots, wherein a cross-sectional shape of the first connector in a plane perpendicular to a longitudinal axis of the first connector corresponds to a cross-sectional shape of the first retention channel in a plane perpendicular to a longitudinal axis of the first retention channel, wherein a first portion of the cross-sectional shape of the first connector at a particular position along a length of the first connector positioned in the first retention channel is positioned in the first slot of the first set of slots and not in the first slot of the second set of slots, and wherein a second portion of the cross-sectional shape of the first connector at the particular position is positioned in the first slot of the second set of slots and not in the first slot of the first set of slots;
a second connector comprising the first material and having a second cross-sectional shape corresponding to a combined cross-sectional shape of a second slot of the first set of slots and a second slot of the second set of slots;
a third connector comprising the first material and having a third cross-sectional shape corresponding to a combined cross-sectional shape of a third slot of the first set of slots and a first slot of the third set of slots; and
a fourth connector comprising the first material and having a fourth cross-sectional shape corresponding to a combined cross-sectional shape of a third slot of the second set of slots and a second slot of the third set of slots,
wherein thermal expansion characteristics of the plurality of connectors are different from thermal expansion characteristics of materials of the plurality of mold components such that when the plurality of connectors are inserted into respective retention channels and heat is applied to the plurality of mold components, resulting thermal expansion generates clamping forces between surfaces of the plurality of mold components.

14. The assembly of claim 13, wherein the cross-sectional shape has a concave region.

15. The assembly of claim 13, wherein the first connector has a length greater than a length of the first slot of the first set of slots and greater than a length of the first slot of the second set of slots.

16. The assembly of claim 15, wherein the third mold component further defines a recess to accommodate an end of the first connector.

17. The assembly of claim 13, wherein one or more connectors of the plurality of connectors defines a hole at one end to facilitate extraction of the one or more connectors from respective slots.

18. The assembly of claim 13, further comprising one or more thermal exchange elements coupled to or within one or more of the plurality of mold components, within one or more of the plurality of connectors, or within one or more of the plurality of mold components and one or more of the plurality of connectors.

19. A method comprising:
   forming an assembly of a plurality of mold components and a plurality of connectors by:
      aligning a first mold component and a second mold component, wherein the first mold component defines a first portion of a mold cavity and a first set of slots and the second mold component defines a second portion of the mold cavity and a second set of slots;
      sliding a first connector into a first retention channel, wherein the first retention channel is formed when a first slot of the first set of slots is aligned with a first slot of the second set of slots, wherein a cross-sectional shape of the first connector in a plane perpendicular to a longitudinal axis of the first connector corresponds to a cross-sectional shape of the first retention channel in a plane perpendicular to a longitudinal axis of the first retention channel, wherein a first portion of the cross-sectional shape of the first connector at a particular position along a length of the first connector positioned in the first retention channel is positioned in the first slot of the first set of slots and not in the first slot of the second set of slots, and wherein a second portion of the cross-sectional shape of the first connector at the particular position is positioned in the first slot of the second set of slots and not in the first slot of the first set of slots;
   sliding a second connector into a second retention channel corresponding to a second slot of the first set of slots and a second slot of the second set of slots;
   aligning a third mold component with the first and second mold components, wherein the third mold component defines a third portion of the mold cavity and a third set of slots;
   sliding a third connector into a third retention channel corresponding to a third slot of the first set of slots and a first slot of the third set of slots; and
   sliding a fourth connector into a fourth retention channel corresponding to a third slot of the second set of slots and a second slot of the second set of slots; and
subjecting the assembly to heating to generate clamping forces between surfaces of the assembly due to thermal expansion of the assembly.

20. The method of claim 19, further comprising:
after forming the assembly, inserting a molding agent into the mold cavity while the assembly is subjected to heating;
after inserting the molding agent into the mold cavity, allowing the assembly to cool; and
disassembling the assembly by sliding the plurality of connectors from corresponding retention channels.

* * * * *

UNITED STATES PATENT AND TRADEMARK OFFICE
CERTIFICATE OF CORRECTION

| | |
|---|---|
| PATENT NO. | : 11,224,996 B2 |
| APPLICATION NO. | : 16/290323 |
| DATED | : January 18, 2022 |
| INVENTOR(S) | : Adriana Willempje Blom-Schieber and Jack Schieber |

It is certified that error appears in the above-identified patent and that said Letters Patent is hereby corrected as shown below:

On the Title Page

Change the lead inventor's last name under Item (12), from:
"Willempje Blom-Schieber et al."

To read:
--Blom-Schieber et al.--

Signed and Sealed this
Twenty-first Day of February, 2023

Katherine Kelly Vidal
*Director of the United States Patent and Trademark Office*